(12) United States Patent
Coon

(10) Patent No.: US 7,035,051 B1
(45) Date of Patent: *Apr. 25, 2006

(54) LOW STIFFNESS, HIGH TORSION SUSPENSION FOR DISK DRIVES

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/245,923

(22) Filed: Oct. 7, 2005

Related U.S. Application Data

(63) Continuation-in-part of application No. 10/889,605, filed on Jul. 12, 2004, which is a continuation of application No. 09/904,972, filed on Jul. 12, 2001, now Pat. No. 6,768,613.

(60) Provisional application No. 60/670,496, filed on Apr. 11, 2005, provisional application No. 60/292,119, filed on May 18, 2001, provisional application No. 60/298,524, filed on Jun. 15, 2001.

(51) Int. Cl.
*G11B 5/48* (2006.01)
(52) U.S. Cl. .............................. 360/245.9; 360/344.3; 360/244.8
(58) Field of Classification Search ............ 360/245.9, 360/244.8, 244.3
See application file for complete search history.

(56) References Cited

U.S. PATENT DOCUMENTS 5,612,840 A * 3/1997 Hiraoka et al. .......... 360/245.9
6,768,613 B1 * 7/2004 Coon ...................... 360/245.9

* cited by examiner

*Primary Examiner*—Robert S. Tupper
(74) *Attorney, Agent, or Firm*—Louis J. Bachand

(57) ABSTRACT

A low stiffness, high torsion disk drive suspension having reduced gram load change after backbending includes a laminate of a metal layer, a plastic film layer and a plurality of conductors, a spring portion, a base portion and a distal portion with contiguous discontinuities that reduce the vertical stiffness of the suspension with only a low reduction in torsion, and that limit gram load changes by preventing stretching of the plastic film that would otherwise accompany backbending of the spring portion of the suspension.

27 Claims, 9 Drawing Sheets

LOW STIFFNESS, HIGH TORSION SUSPENSION FOR DISK DRIVES

CROSS-REFERENCE TO RELATED APPLICATIONS

This application claims the benefit of U.S. Provisional Application Ser. No. 60/670,496, filed Apr. 11, 2005, and is a continuation-in-part of U.S. patent application Ser. No. 10/889,605, filed Jul. 12, 2004, which application is a continuation of U.S. patent application Ser. No. 09/904,972, filed Jul. 12, 2001, now U.S. Pat. No. 6,768,613, which application claims the benefit of U.S. Provisional Application Ser. No. 60/292,119, filed May 18, 2001, and Ser. No. 60/298,524, filed Jun. 15, 2001.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to achieving lower vertical stiffness values in a suspension while retaining in large part the torsion properties normally thought to be compromised by decreasing suspension stiffness. In a further aspect, the invention provides for the retention of intended gram load values of the suspension despite backbending of the suspension that may occur during head stack assembly, combing or other mechanical operations that cause the suspension to be bent, even briefly, along its longitudinal axis. In general, these results are realized by removing selected metal layer material from the suspension in the spring portion and in the adjacent distal portion and/or base portion as well. Sway resonant frequency is also improved with the invention.

2. Description of the Related Art

Each suspension application has a vertical stiffness requirement. Selection of suspension spring portion length, thickness width, within the overall size limitations imposed by the application determines the vertical stiffness, with increased width associated with increased stiffness. In general, vertical stiffness is desirably minimized. Torsional frequency response of a suspension, a function of torsion stiffness, herein generally called simply torsion, is desirably maximized and this can be done by increasing the width of the spring portion, within limits imposed by the application and the need to keep stiffness low. There is thus a trade-off between stiffness and torsion that is generally resolved by using a wide spring portion and having a hole in the center thereof to reduce the volume of metal and keep width or lateral extent up.

BRIEF SUMMARY OF THE INVENTION

There is a continuing need to lower stiffness and yet maintain adequate torsion values. Ideally, the unit loss of torsion should be minimized for units of decrease in vertical stiffness. The invention has as an object the provision of a suspension design that eliminates or greatly reduces the amount of lost torsion for each increment in stiffness reduction. It is a further object to provide reduced vertical stiffness in a suspension and little or no loss in torsion. A further object is to provide a suspension in which the change in intended gram load is minimized through the utilization of the same suspension structure that provides the better ratio of torsion loss/stiffness decrease. It is a specific object to provide a suspension in which there is a discontinuity providing an aperturing locally in the spring portion carrying on to the proximate (base) and/or distal portion of the suspension that enables a decrease in suspension stiffness at little or no loss in torsion. The discontinuity further acts to allow the plastic film part of the suspension subassembly to avoid stretching with the metal layer part of the laminate or suspension spring portion during backbending of the suspension by passing the film and/or the film and metal layer through the discontinuity chordally instead of bending arcuately with the spring portion. The problem of the stretched plastic film changing the suspension intended gram load is thus avoided.

These and other objects of the invention to become apparent hereinafter are realized in low stiffness, high torsion disk drive suspension for applying an intended gram load comprising a laminate of a metal layer and a subassembly comprising a plastic film layer and a plurality of conductors, a base portion, a distal portion, and a spring portion traversed by the subassembly, the spring portion and neither, either or both of the base portion and the distal portion being discontinuous for passing of the subassembly through the respective planes of the portions upon bending of the spring portion, whereby stretching of the plastic film layer and resultant change in the intended gram load is limited.

In this and like embodiments, typically, the spring portion comprises a separately formed element attached to the base portion and the distal portion in connecting relation, the suspension distal portion is discontinuous opposite the subassembly in subassembly passing relation upon spring portion bending, the suspension base portion is discontinuous opposite the subassembly in subassembly passing relation upon spring portion bending, the spring portion is formed from the laminate metal layer, the spring portion is discontinuous opposite the subassembly and over the adjacent edge margin of the distal portion in subassembly passing relation, and neither or both of the base portion and the distal portion is/are discontinuous opposite the subassembly.

In a further embodiment, the invention provides a low stiffness, high torsion disk drive suspension for applying an intended gram load comprising a laminate of a metal layer and a subassembly comprising a plastic film layer and a plurality of conductors, a base portion, a distal portion, and a separately formed spring portion connecting the base portion to the distal portion, the spring portion being traversed by the subassembly, the spring portion being discontinuous to pass the subassembly through the plane of the spring portion upon bending of the spring portion toward from the subassembly, whereby stretching of the plastic film and resultant change in intended gram load are reduced from that occurring when the subassembly is bent with the spring portion and its film layer stretched.

In this and like embodiments, typically, the laminate metal layer comprises stainless steel, the plastic film comprises a polyimide film, the distal portion comprises a stiffener of greater stiffness than the laminate metal layer for supporting the laminate, the spring portion is separately formed from the base and distal portions and fixed thereto, the spring portion is discontinuous opposite the subassembly and over the adjacent edge margin of the distal portion in subassembly passing relation, the spring portion is formed from the laminate metal layer, the suspension base portion is discontinuous opposite the subassembly in subassembly passing relation upon spring portion bending, the suspension distal portion is discontinuous in subassembly passing relation upon spring portion bending, and neither or both of the base portion and the distal portion is/are discontinuous opposite the subassembly.

In a still further embodiment the invention provides a low stiffness, high torsion disk drive suspension for applying an intended gram load, the suspension comprising a laminate of a metal layer and a subassembly comprising a plastic film layer and a plurality of conductors, a base portion, a distal portion, and a spring portion traversed by the subassembly, the spring portion and one or both of the base portion and the distal portion being discontinuous for passing of the subassembly through the respective planes of the portions upon bending of the spring portion, whereby stretching of the plastic film layer and resultant change in the intended gram load is limited.

In this and like embodiments, typically, the spring portion is separately formed from the base and distal portions and fixed thereto, and the spring portion is discontinuous opposite the subassembly and over the adjacent edge margin of the distal portion in subassembly passing relation.

In a highly particular embodiment, the invention provides a low stiffness, high torsion disk drive suspension having an intended gram load, the suspension comprising for mounting by a mounting plate having a distal edge a laminate of a metal layer and a subassembly of a plastic film layer and a plurality of conductors separated from the metal layer by the plastic film layer, the suspension having a proximate base portion substantially free of the conductors and adapted to be mounted to an actuator with the mounting plate, a distal portion adapted to mount a slider electrically connected to the conductors, a spring portion separately formed from and connecting the proximate and distal portions, and a stiffener fixed to the distal portion distally of the spring portion, the stiffener having a proximate edge; a suspension first region between the proximate edge and the distal edge and extending in a plane generally parallel with the spring portion plane and having substantially the length and width of the spring portion, the first region defining a first discontinuity within the first region; a suspension second region contiguous with and distal to the first region and including the proximate edge, the second region defining a second discontinuity that is a continuation of the first region discontinuity; and a suspension third region contiguous with and proximate of the first region and including the distal edge, the third region defining a third discontinuity including the distal edge, whereby the subassembly moves in response to backbending of the spring portion in an arc through the first, second and third discontinuities rather than stretching fully over the arc of spring portion to lessen any change in the intended gram load resultant from stretching of the plastic film layer in the subassembly.

In its method aspects, the invention provides a method of limiting gram load changes in a disk drive suspension comprising a laminate of a metal layer and a subassembly of a plastic film and a plurality of conductors, and a base portion, a spring portion and a distal portion, including defining a discontinuity in the spring portion and in adjacent portions of one or both of the base and distal portions that passes the subassembly in the bent condition of the spring portion through the discontinuity chordally to the arc of the bent spring portion against stretching of the plastic film along the arc and thereby changing the gram load of the suspension.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
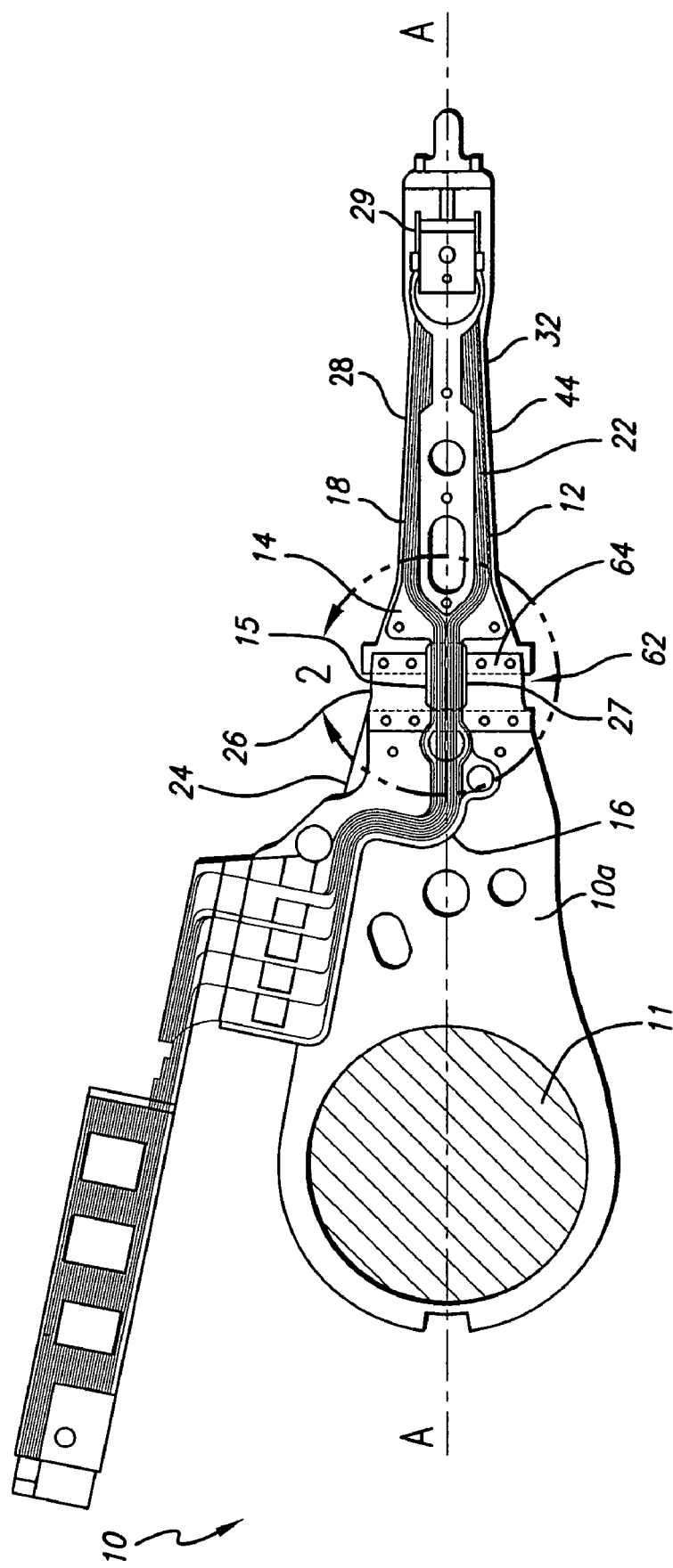
FIG. 1 is a plan view of the invention suspension.
Figure 2:
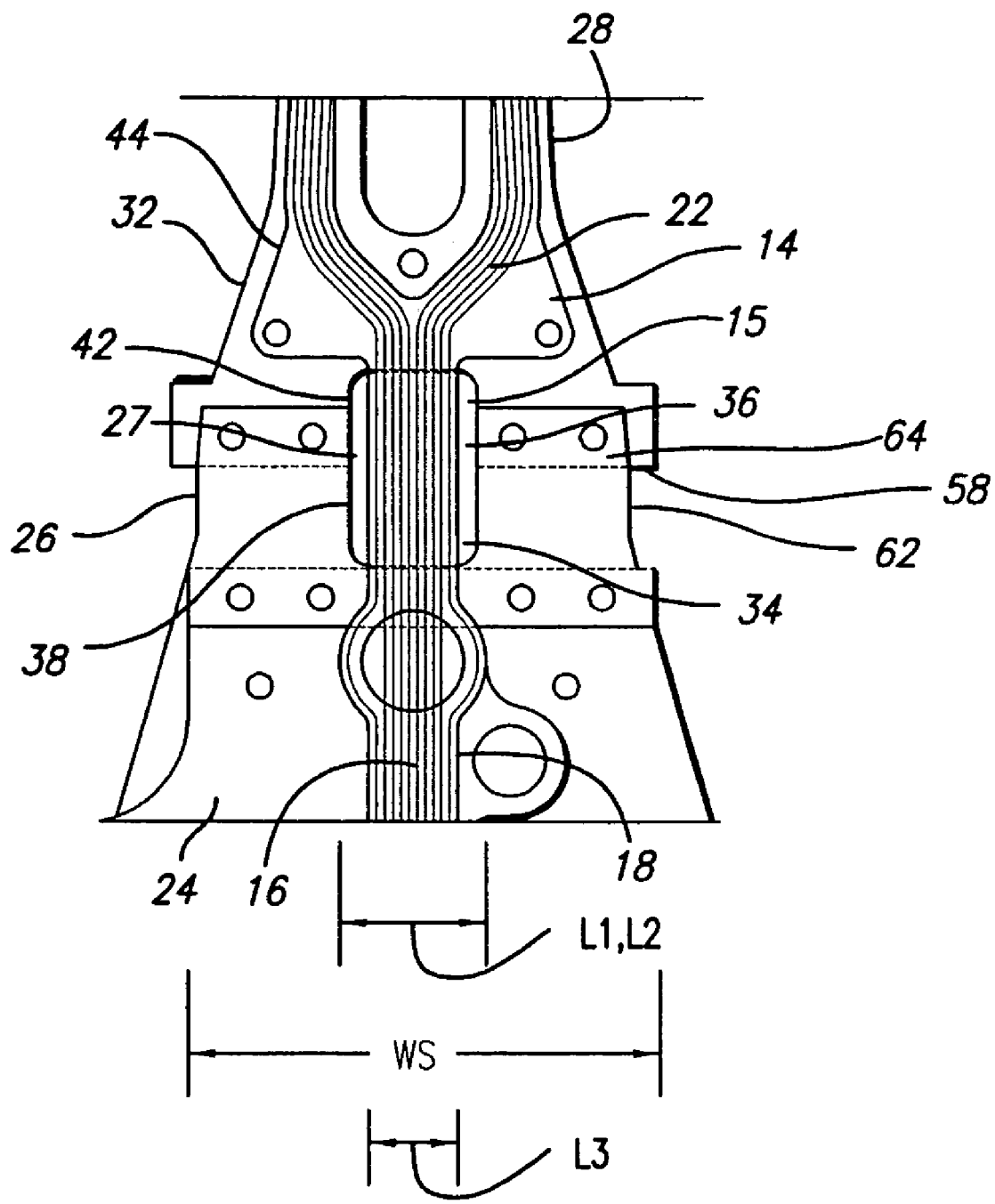
FIG. 2 is a fragmentary view taken on line 2 in FIG. 1.

It has been found that an increase in the length and width of the center hole in a flexible circuit type suspension spring portion, to extend in or through and beyond the spring portion and into the base portion or distal, rigid portion of the suspension, effects a great reduction in stiffness, but remarkably a very small if any reduction in torsion, measured as torsional stiffness. In addition, there is no need to change the remaining geometry of the stiffener. A suspension having a spring section with no cutout or hole is the stiffest in the vertical direction as well as in torsion. Modeling data demonstrate that adding a hole to the spring portion only will, in a given case, effect a 12.5% reduction in vertical stiffness, at the cost of a 1.7% reduction in torsion. The invention use of a larger hole, one that extends through the spring portion and into the rigid or distal portion, e.g. is about doubled in longitudinal extent from its extent through the spring portion, will effect a 17.8% reduction in vertical stiffness, and only a 1.9% reduction in torsion, that is the additional 5.3% of vertical stiffness reduction (17.8−12.5=5.3) is obtained at a cost of 0.2% reduction in torsion (1.9−1.7=0.2). The ratio of vertical stiffness reduction to torsion reduction is vastly increased over systems employing only a spring portion discontinuity or cut-out. In the example just given, the added 5.3% decrement in vertical stiffness was achieved with just a 0.2% decrement in torsion added, a ratio of 25.6 to 1.

In contrast, the spring portion only aperturing had a ratio of 7.35 to 1 in stiffness decrease to torsion decrease. Additional data appears hereinafter. Thus the invention provides in this example a more than three times greater unit change in vertical stiffness for each unit change in torsion over spring portion only aperturing. The aperture can be an enclosed figure, or a forwardly open or rearwardly open, rectangular or curved side aperture, as will be explained hereinafter.

With reference now to the drawings, and with particular reference to FIGS. 1–4, the invention low stiffness, high torsion disk drive suspension 10 is shown in a unimount version where the suspension connects directly to the actuator shaft 11 without use of an arm or mount plate. Suspension 10 comprises a load beam plate 10a attached to the actuator 11. A laminate 12 of a metal layer 14 and a subassembly 16 is fixed to the load beam plate 10a. Subassembly 16 comprises a plastic film layer 18 and a plurality of conductive traces or simply conductors 22 and is typically adhered to the metal layer 14, the laminate 12 being supported by the base plate 10a.

Metal layer 14 of the laminate 12 provides suspension base portion 24, a spring portion 26 and a distal portion 28 that forms a flexure 29. Suspension 10 further comprises a stiffener 32 fastened to the laminate metal layer distal portion 28. Stiffener 32 is generally congruent with the opposing part 44 of the distal portion 28, as shown.

Load beam plate 10a and stiffener 32 are spaced longitudinally as shown on either end, i.e. proximate of and distal to, respectively, the suspension spring portion 26. Suspension 10 has spring portion 26 and the suspension flexure 29, both defined by the laminate metal layer 14 as is characteristic of a so-called unibeam suspension.

Figure 3:
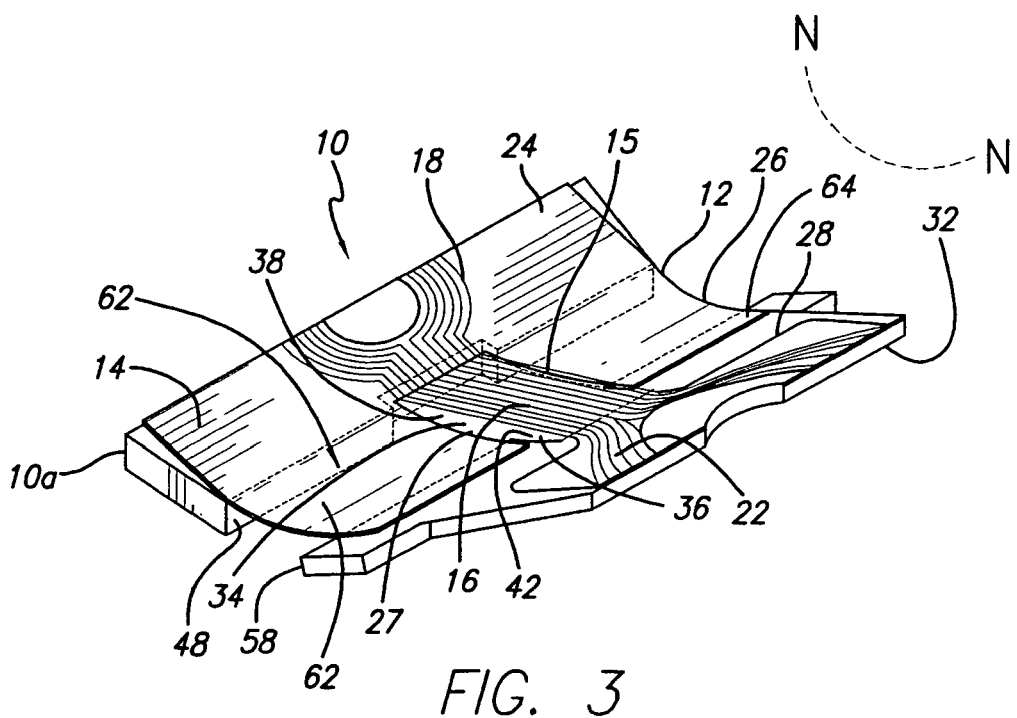
FIG. 3 is a fragmentary, oblique view of the suspension with a normal bend for a given gram load, at rest.

Spring portion 26 has a normal arcuate bend along plane N—N, see FIG. 3. When back bent, see FIG. 4, the spring portion 26 takes on a reverse bend along an arcuate plane B—B. Metal layer 14 has aperturing 15 to be locally discontinuous in the spring portion 26. Aperturing 15 is generally opposite the plastic film 18 and conductive traces 22 of laminate subassembly 16. Aperturing 15 is located and sized to permit the subassembly 16 to pass through the plane B—B of the spring portion 26 upon back bending of the spring portion. By passing into the gap 27 provided by aperturing 15 rather than lying atop the back bent spring portion 26 and traversing the full arc B—B of the spring portion, the subassembly 16 does not undergo the arc B—B and there is no, or less, stretching in the plastic film layer 18. The absence or reduction in plastic film 18 stretching eliminates or decreases changes in the intended gram load normally resultant from stretching distortion of the plastic film layer.

To provide the passageway for the suspension subassembly 16 to pass through the arcuate plane B—B of the reversely bent and thus arcuate metal layer 14 at spring portion 26, aperturing 15 defines a hole 34 in the spring portion and a continuation hole 36 of the hole 34 in the distal portion 28. See FIGS. 3 and 4.

Holes 34 and 36 are formed by aperture 15 so that the metal layer 14 is locally discontinuous at 38 in the spring portion 26 and at 42 in the distal portion 28. The discontinuities 38, 42 and thus holes 34, 36 are contiguous and open to each other, each being a continuation of the other. In general, a typical hole 34, 36 will together be about 1.5 to 4 times as long as wide, and preferably about twice as long as wide, and, as noted below, will be rectangular, as shown, or of different specific shapes to have uniform or varying widths along their length, with edges that are straight or curved, as shown hereinafter.

Typically in the invention suspension 10, the metal layer 14 comprises stainless steel about 0.00098 inch thick, the plastic film layer 18 comprises a polyimide film about 0.00065 inch thick, the stiffener 32 comprises a stainless steel member of greater thickness than the metal layer distal portion at about 0.00400 inch thick, and there may be a cover layer of resin, not shown, that may be about 0.00032 inch thick. The conductors 22 are traces generally about 0.00071 inch thick.

The locally discontinuous metal layer 14 defines in the spring portion 26 the first discontinuity 38 to have a lateral extent L1 equal to about 35% to about 70% of the lateral extent or width WS of the spring portion. This width is suitably uniform throughout the length of the discontinuity 38, or the discontinuity can be varied in width at the distal or proximate ends thereof, and/or at a locus between the ends, relatively more closely adjacent the distal end or the proximate end of the discontinuity, or intermediate the ends. Such extensions of the lateral width WS of the discontinuity 38 are themselves generally uniform in length and width, although this can be varied in particular cases.

The locally discontinuous metal layer 14 defines in the distal portion 28 the second discontinuity 42 to have a lateral extent L2 substantially the same as the first discontinuity 38. First and second discontinuities 38, 42 are shown centered on the metal layer 14 longitudinal axis A—A, with the subassembly 16 being centered on the metal layer longitudinal axis and having a lesser lateral extent L3 than the lateral extent L1, L2 of the first and second discontinuities 38, 42, respectively.

Stiffener 32 is fixed to the distal portion 28 forward of the spring portion 26 in opposed or underlying relation, as shown, to be away from the subassembly that enters the discontinuity 42. As noted, spring portion 26 before backbending extends in a normally curved arcuate plane N—N between the proximate base portion 24 and distal portion 28. Stiffener proximate edge 58 lies opposite the load beam plate 10a distal edge 48. Metal layer 14 defines between these proximate and distal edges 48, 58 a first region 62 having substantially the length and width of the spring portion 26. This first region 62 defines the first discontinuity 38 whereby the subassembly 16 is substantially free of the metal layer 14 opposite conductors 22 within the first region. Metal layer 14 also defines a second region 64 contiguous with, substantially coplanar with, and distal to the first region 62 and oppositely adjacent the stiffener 32. The second region 64 defines the second discontinuity 42 as a continuation of the first region discontinuity 38, whereby the subassembly 16 is substantially free of the metal layer 14 opposite the conductors 22 within the second region.

Subassembly 16 moves independently of the metal layer 14 in the first and second discontinuities 38, 42, so that, as stated, in response to backbending of the metal layer in an arc plane B—B from normal arcuate plane N—N, the subassembly moves through the metal layer at the discontinuities therein rather than stretching fully over the arc of the bent metal layer as a function of the presence of the first and second discontinuities in the metal layer opposite the subassembly to lessen any change in the intended gram load resultant from stretching of the plastic film layer in the subassembly.

Figure 4:
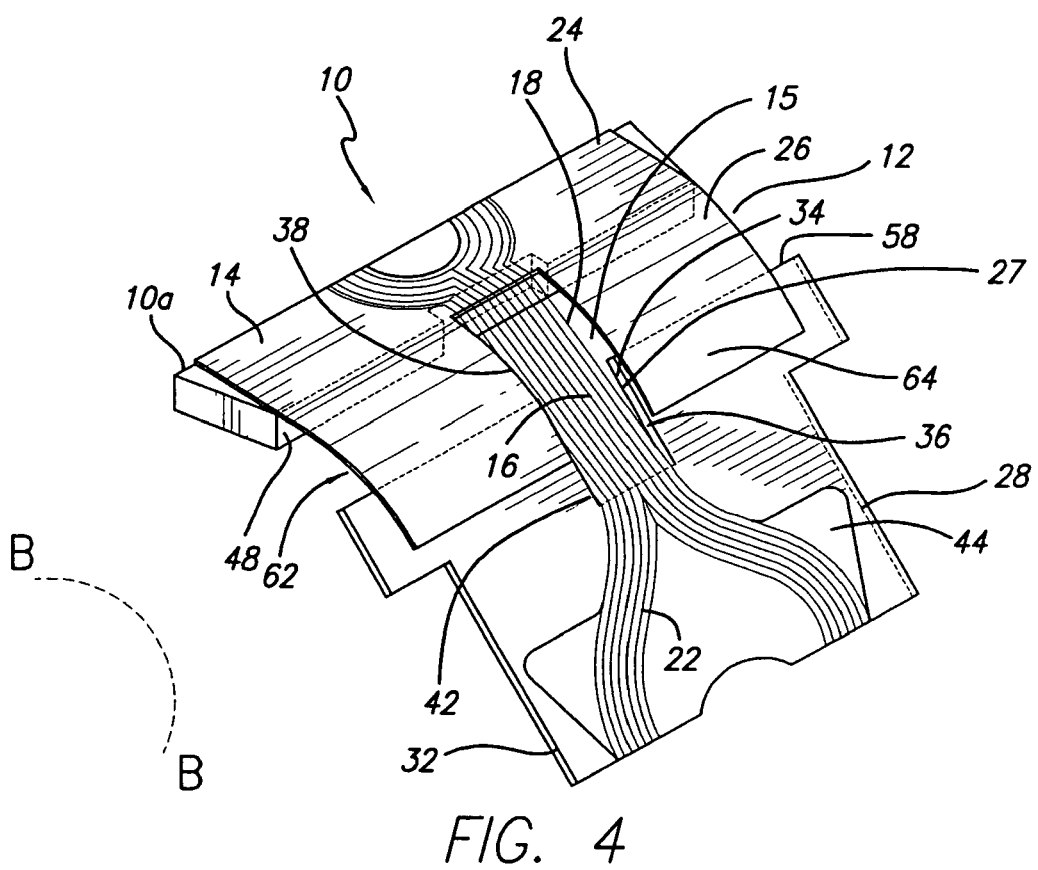
FIG. 4 is a view like FIG. 3 showing the backbending of the suspension in FIG. 3.
Figure 5:
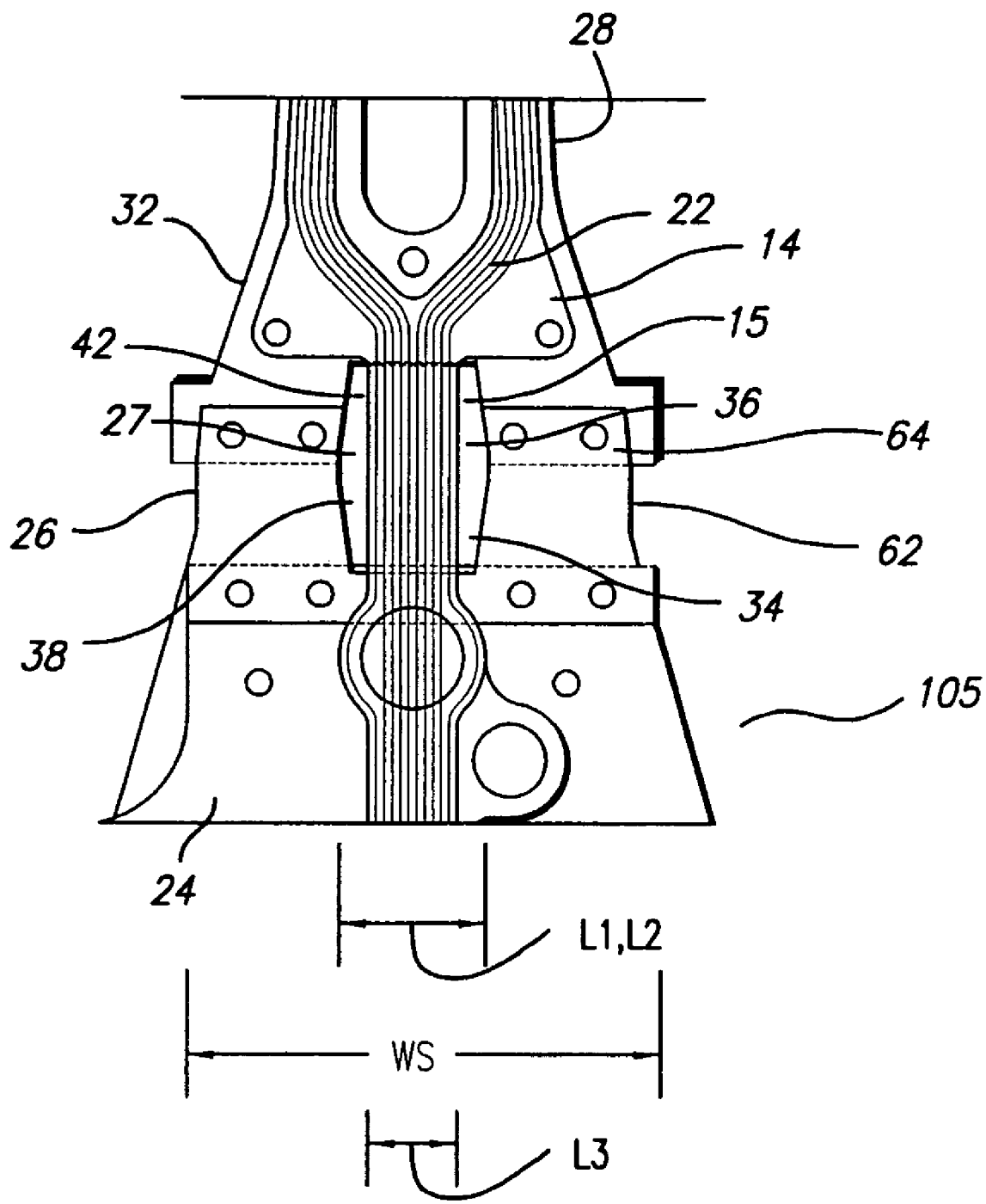
FIG. 5 is a fragmentary plan view of a further embodiment.

FIG. 5, in which like numerals indicate like parts to the FIGS. 1–4 embodiment, show suspension 105 in which the aperturing 15 continues distally as in FIGS. 1–4 but also continues proximally as shown, and the aperturing 15 is more oval than rectangular.

Figure 6:
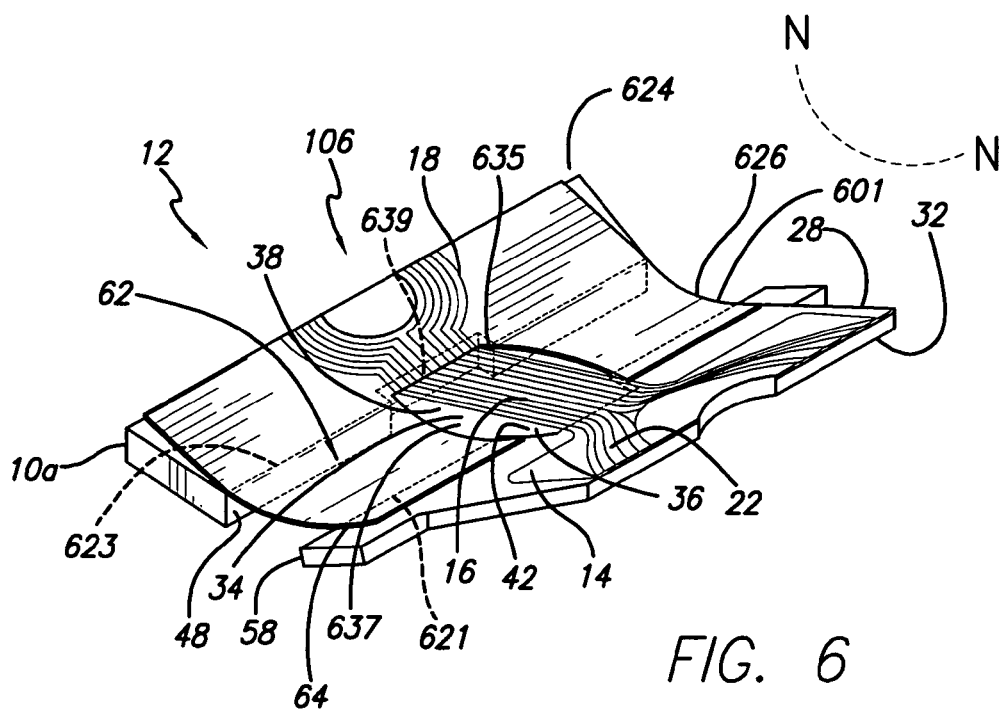
FIG. 6 is a fragmentary, oblique view of a further embodiment of the suspension with a normal bend for a given gram load, at rest.
Figure 7:
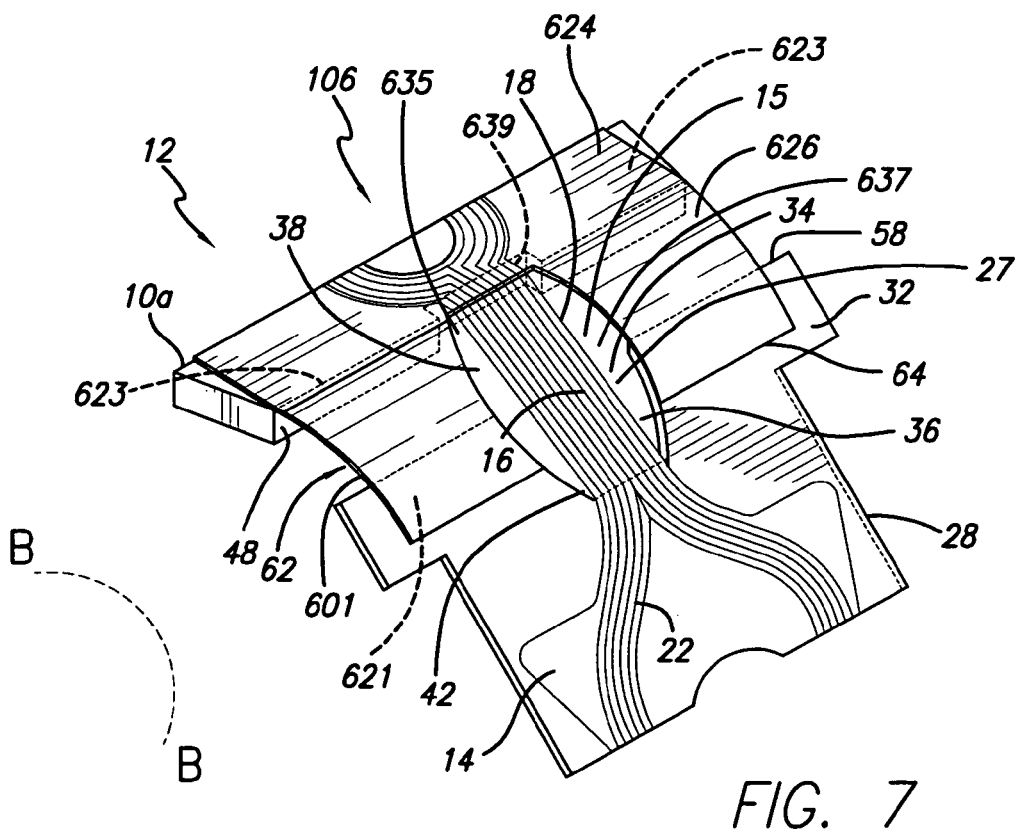
FIG. 7 is a view like FIG. 6 showing the backbending of the suspension in FIG. 6.

In FIGS. 6 and 7, in which like numerals indicate like parts to the previous embodiments, suspension 106 comprises a laminate 12 of a metal layer 14 and a subassembly 16 comprising a plastic film layer 18 and a plurality of conductors 22. Suspension 106 further includes a base portion 24, a distal portion 28, and the separately formed and subsequently attached spring portion 626 that are traversed by the subassembly 16. The spring portion 626 is locally discontinuous; while neither, either or both of the base portion 24 and the distal portion 28 can be locally discontinuous, both the base portion and the distal portion are shown here as locally discontinuous, such that subassembly 16 passes through the respective planes of the portions upon bending of the spring portion. Thus is stretching of the plastic film layer 18 and resultant change in the intended gram load limited.

Spring portion 626 comprises a separately formed spring section element 601 attached to the base portion 24 and the distal portion 28 in connecting relation. The suspension distal portion 28 is discontinuous opposite the subassembly 16, as shown, in subassembly passing relation upon spring portion 626 bending; the suspension base portion 24 is, as also shown, discontinuous opposite the subassembly 16 in subassembly passing relation upon spring portion 626 bending.

To provide the passageway for the suspension subassembly 16 to pass through the arcuate plane B—B of the reversely bent and thus arcuate metal layer 14 at spring portion 626, aperturing 15 (FIG. 7) defines a hole 34 in the spring portion and a distal continuation hole 36 of the hole 34 in the distal portion 28, and a proximate continuation hole 635 in the base portion 24. See FIGS. 6 and 7.

Holes 34, 36 and 635 are formed by aperture 15 so that the spring portion 626 is locally discontinuous at 38 in the spring portion 626, at 42 in the distal portion 28, and at 639 in the base portion 24. The discontinuities 38, 42, 639 and thus holes 34, 36 and 635 are contiguous and open to each other, each being a continuation of the other.

Spring portion 626, while separately formed, can be formed from the laminate metal layer 14 as a source of material, but is more typically a separate material altogether. Spring portion 626 is shown to be not only discontinuous opposite the subassembly 16 but also over the adjacent edge margin 621 of the distal portion 28 in subassembly passing relation. In this embodiment, both the base portion 24 and the distal portion 28 are discontinuous in their respective edge margins 621, 623 opposite the subassembly 16, and preferably at least the distal portion edge margin is discontinuous opposite the subassembly 16.

More particularly in the embodiment of FIGS. 6 and 7 the disk drive suspension 106 comprises laminate 12 of metal layer 14 and a subassembly 16 comprising the plastic film layer 18 and a plurality of conductors 22. Suspension base portion 24 and distal portion 28 are connected by the separately formed spring portion 626 such that the subassembly 16 traverses that spring portion with the spring portion being discontinuous to pass the subassembly upon bending of the spring portion toward the subassembly and through the plane of the spring portion to reduce stretching of the plastic film and resultant change in intended gram load from that occurring when the subassembly is bent with the spring portion and its film layer stretched.

In the FIGS. 6 and 7 embodiment, as in previous embodiments, typically the laminate metal layer 14 comprises stainless steel, the plastic film 18 comprises a polyimide film, and the distal portion 28 comprises a stiffener 32 of greater stiffness than the laminate metal layer for supporting the laminate. The spring portion 626 is separately formed from the base and distal portions 24, 28 and fixed as by welding or gluing thereto. The spring portion 626 is discontinuous opposite the subassembly 16 and over the adjacent edge margin 621 of the distal portion 28 in subassembly passing relation. The suspension base portion 24 is discontinuous opposite the subassembly 16 in subassembly passing relation upon spring portion 626 bending. The suspension distal portion 28 is discontinuous in subassembly 16 passing relation upon spring portion 626 bending In the method aspects of the FIGS. 6 and 7 embodiment, the invention method includes defining a discontinuity 637 in the spring portion 601 and in adjacent portions of one or both of the base and distal portions 24, 28 that passes the subassembly 16 in the bent condition of the spring portion through the discontinuity (and adjacent discontinuities when present) chordally to the arc of the bent spring portion against stretching of the plastic film along the arc and thereby changing the gram load of the suspension.

Figure 8:
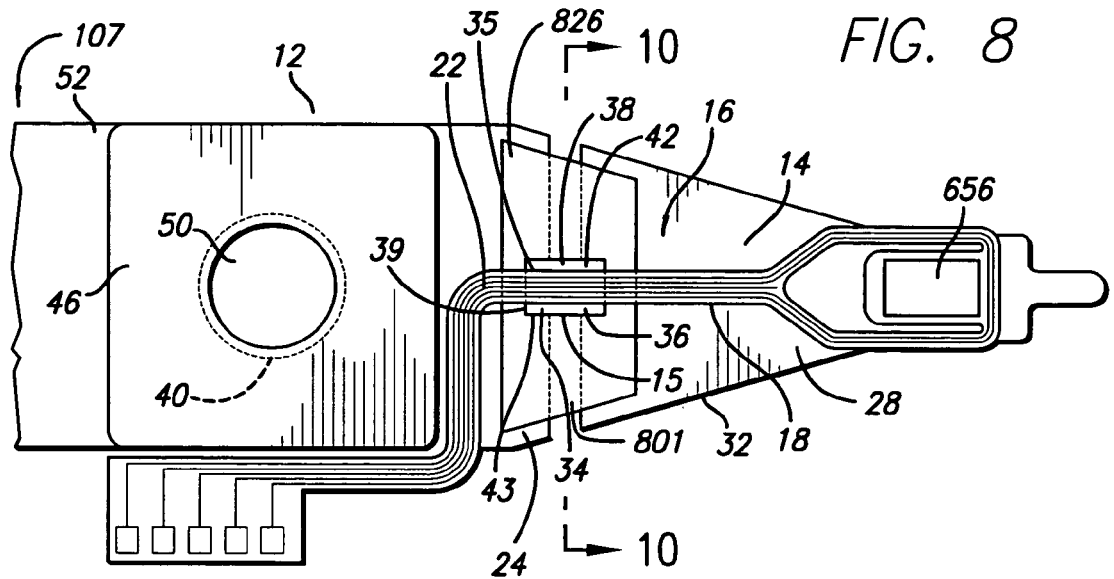
FIG. 8 is a plan view of a further embodiment of the suspension.
Figure 9:
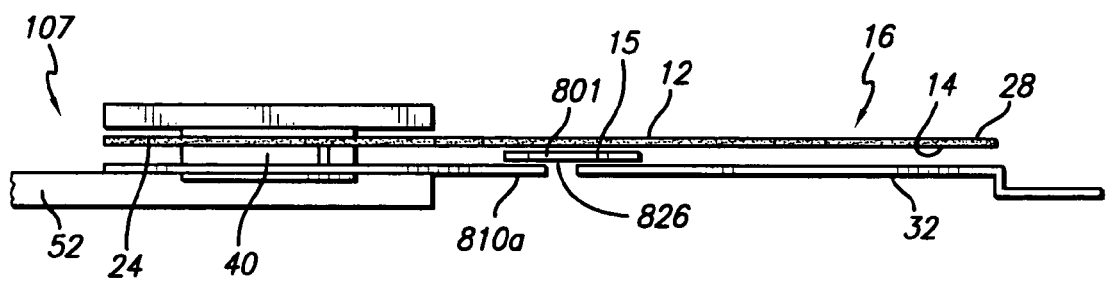
FIG. 9 is a side elevation view thereof.
Figure 10:
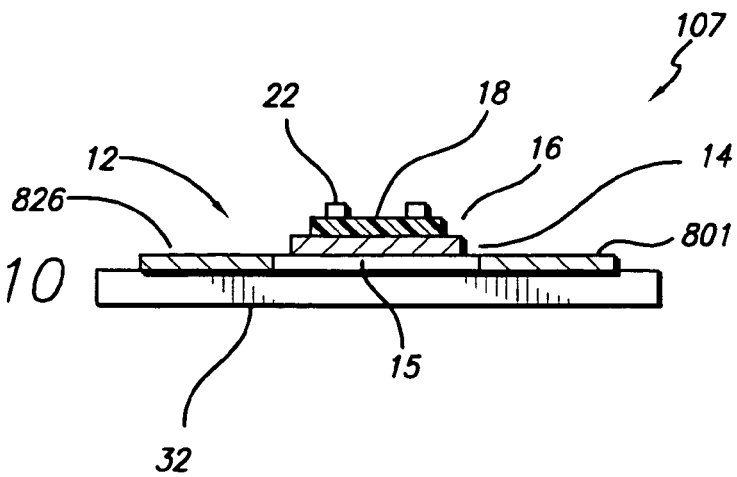
FIG. 10 is a view taken on line 10—10 in FIG. 8.

In FIGS. 8, 9 and 10, a further embodiment is shown in which like parts to previous embodiments have like numerals. In this embodiment, in suspension 107, the metal layer 14 of the subassembly 16 is used as before, but supported by a load beam mounting plate 46 having a boss 40 that swagingly interfits with opening 50 in metal layer base portion 24 for fixing the plate and metal layer portion 24 to an actuator arm 52. Stiffener 32 is connected by a separately formed spring portion 826 comprising spring 801 to metal layer portion 24. Thus, with particular reference to FIGS. 8–10, the invention low stiffness, high torsion disk drive suspension is shown at 107 and comprises a laminate 12 of a metal layer 14 and a subassembly 16 comprising a plastic film layer 18 and a plurality of conductors 22. Laminate 12 has a base or proximate portion 24, a spring portion 826 comprising separately formed spring 801, and a distal portion 28 carrying slider 856. Laminate metal layer 14 has aperturing 15 to be locally discontinuous in the spring portion 826, thus to permit the subassembly 16 to pass through the plane of the spring portion upon bending of the spring portion. This enables the subassembly 16 to not undergo the arc of the metal layer 14 when the suspension spring portion 826 is bent. None, or less, stretching in the plastic film layer 18 eliminates or decreases changes in the intended gram load resultant from distortion of the plastic film layer.

As in previous embodiments, to provide for the suspension subassembly 16 passing through the arcuate plane of the reversely bent and thus arcuate metal layer 14 at spring portion 826, a hole 34 is provided in the metal layer spring portion and a continuation hole 36 of that hole in the distal portion 28, Further holes 35 and 39, generally coincident, are provided proximately of spring portion 826 in metal layer 14 base or proximate portion 24.

Holes 34, 35, and 36 are formed by having the metal layer 14 apertured to be locally discontinuous at 38 in the spring portion 826, at 42 in the distal portion 28, and at 43 in base portion 24. The discontinuities 38, 42 and 43 and thus holes 34, 36 and 39 are contiguous and each a continuation of the other. In general, a typical hole 34, 35 and 36 will be about 1.5 to 4 times as long as wide, and preferably about twice as long as wide, as noted below.

Figure 11:
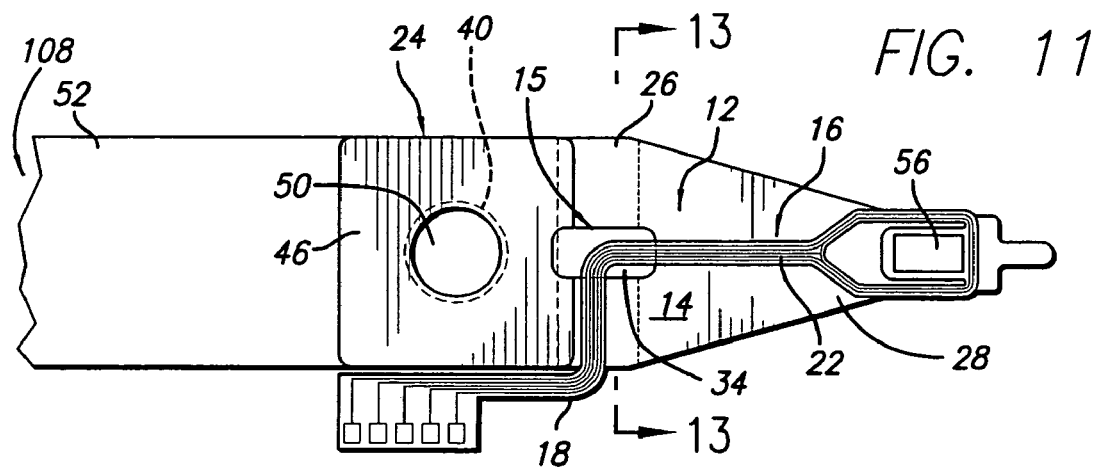
FIG. 11 is a plan view of a further embodiment of the suspension.
Figure 12:
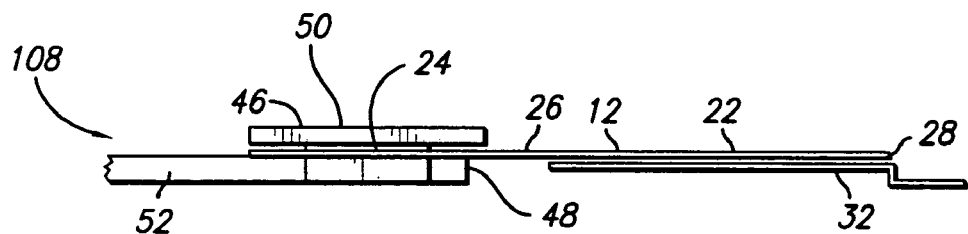
FIG. 12 is a side elevation view thereof.
Figure 13:
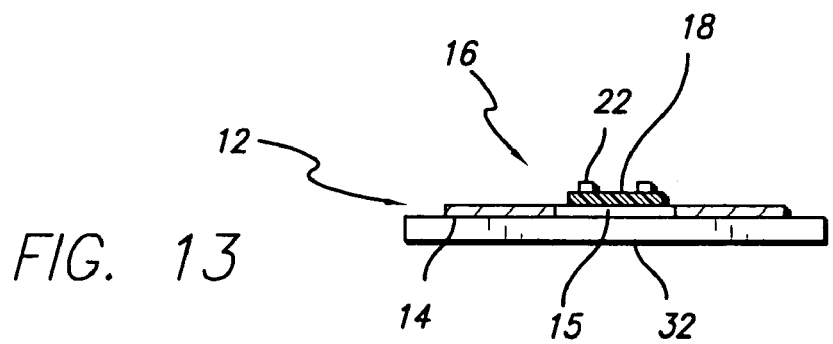
FIG. 13 is a view taken on line 13—13 in FIG. 11.
Figure 14:
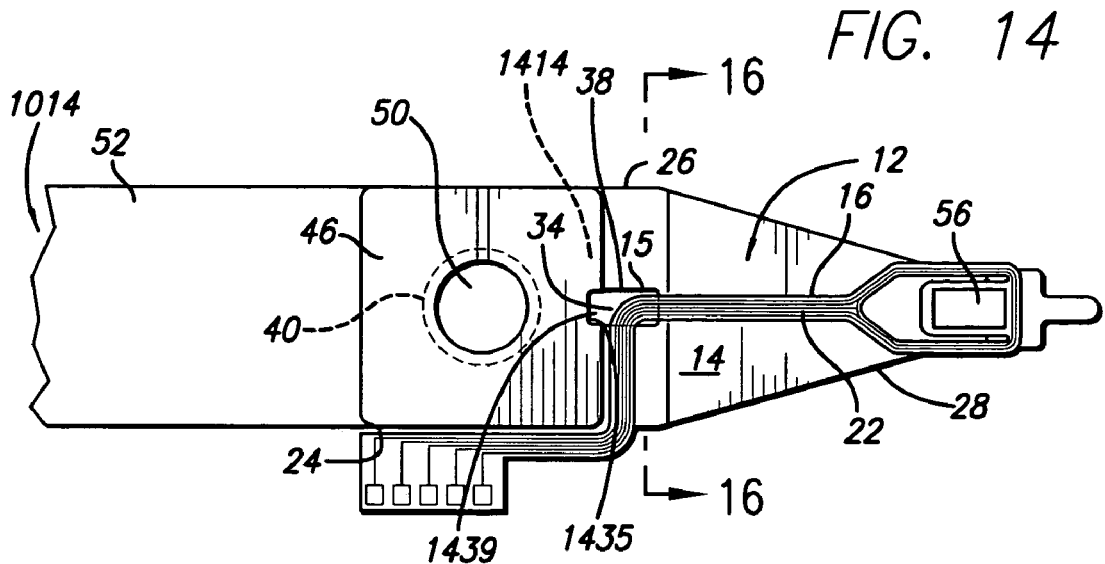
FIG. 14 is a plan view of a further embodiment of the suspension.
Figure 15:
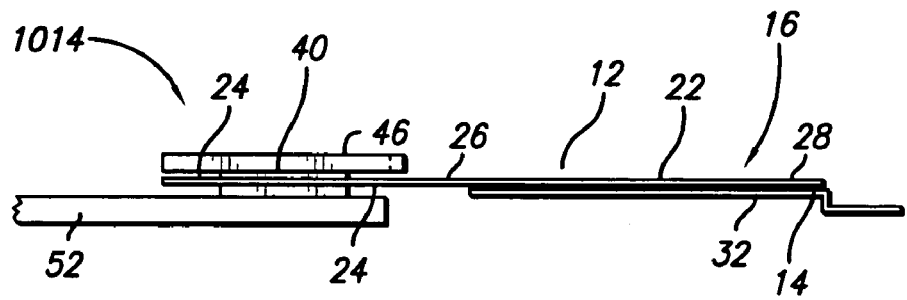
FIG. 15 is a side elevation view thereof.
Figure 16:
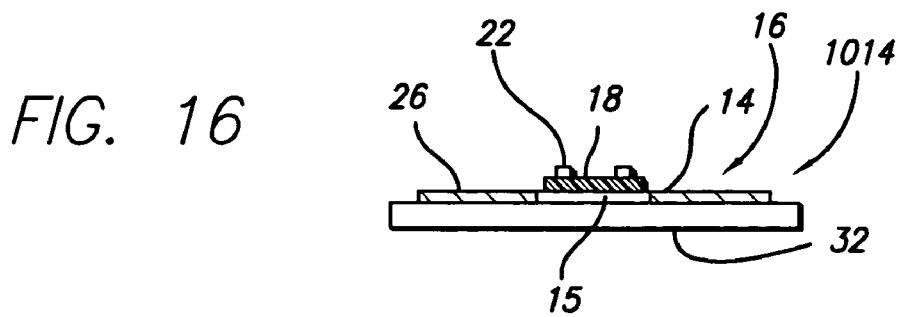
FIG. 16 is a view taken on line 16—16 in FIG. 14.
Figure 17:
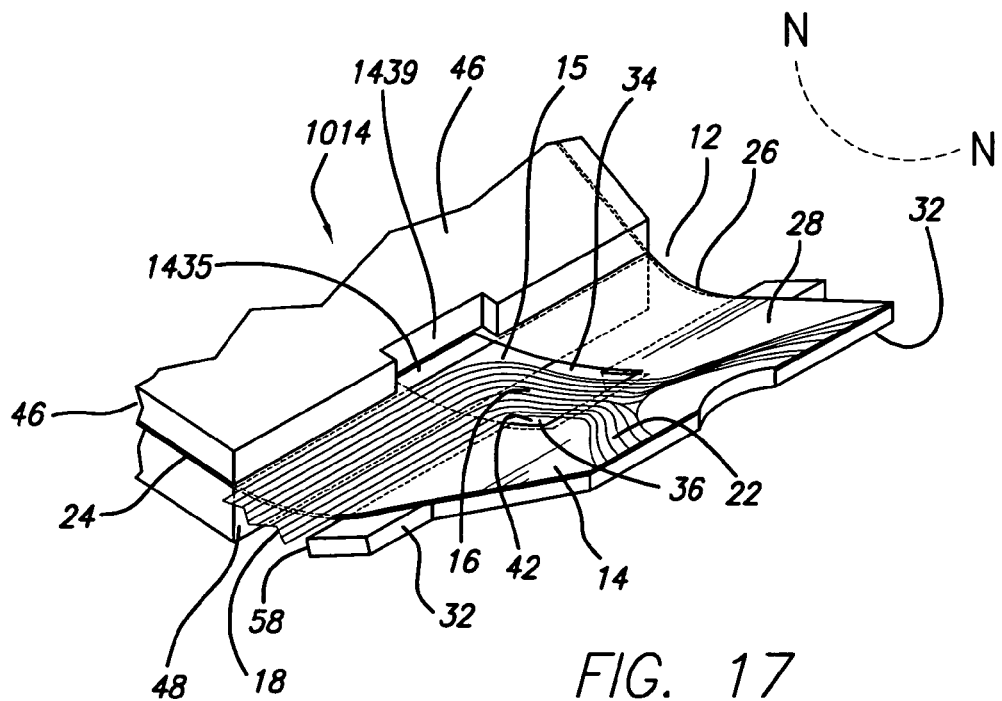
FIG. 17 is a fragmentary, oblique view thereof with a normal bend for a given gram load, at rest; and, FIG. 18 is a view like FIG. 17 showing the backbending of the suspension in FIG. 17.
Figure 18:
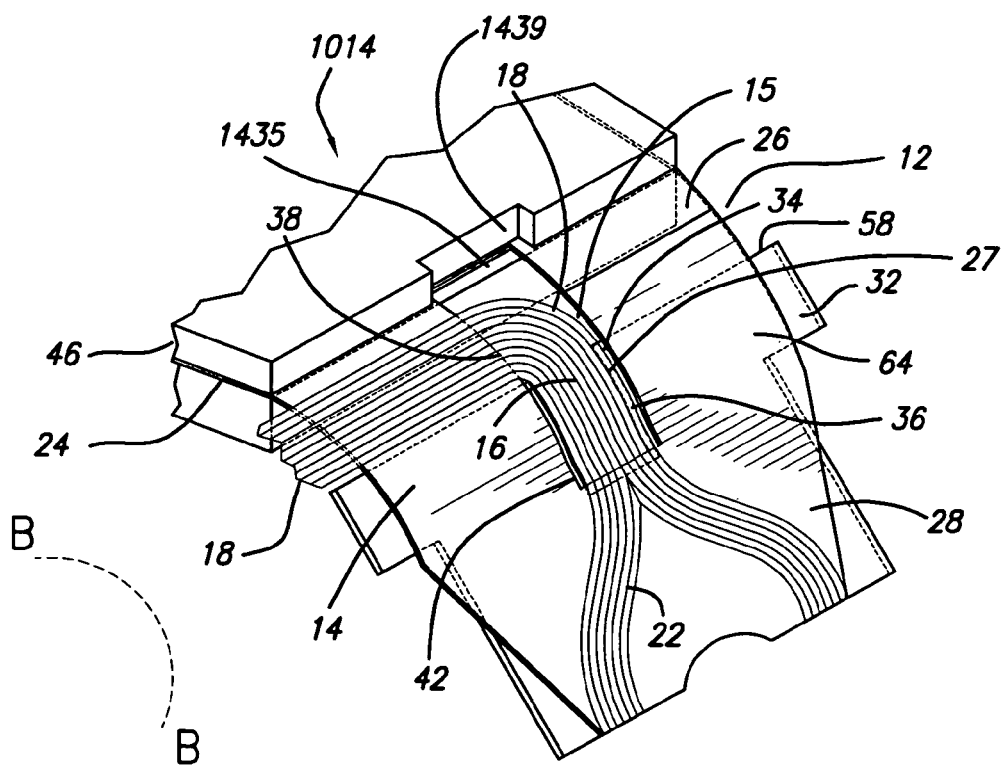

With reference now to FIGS. 11, 12 and 13, suspension 108 is fixed by a mounting plate 46 to an actuator arm 52 that is operated by an actuator not shown. Mounting plate 46 is generally rectangular, is fixed to actuator arm 52, and is typically weld-attached to the suspension base portion 24. As in the previous embodiment, laminate 12 comprises metal layer 14 and the subassembly 16, the subassembly being comprised of plastic film layer 18 and a plurality of conductors 22 separated from the metal layer by the plastic film layer. In this embodiment, the laminate metal layer 14 defines a proximate base portion 24 free of the film 18 and the conductors 22 and mounted to actuator arm 52 by the mounting plate 46. Metal layer 14 further provides the distal portion 28 that is adapted to mount a slider 56 to be electrically connected to the conductors 22. The invention suspension 108 further preferably includes a stiffener 32 attached as by welding, gluing or the like, to the laminate distal portion 28.

Laminate metal layer 14 has aperturing 15 to be locally discontinuous in the spring portion 26, thus to permit the subassembly 16 to pass through the plane of the spring portion upon bending of the laminate 12. Cf. FIGS. 3 and 4. As in the previous embodiments, the aperturing 15 enables the subassembly 16 to not undergo the arc of the metal layer 14 when the suspension 108 is bent at spring portion 26. None, or less, stretching in the plastic film layer 18 eliminates or decreases changes in the intended gram load resultant from distortion of the plastic film layer, as described above for the FIGS. 1–4 first embodiment.

In FIGS. 14, 15, 16, 17 and 18, a further embodiment is shown in which like parts to the previous embodiments have like numerals. In this embodiment, suspension 1014 comprises laminate 12 having metal layer 14 with a proximal portion 24 and a distal portion 28. A stiffener 32 reinforces the laminate metal layer 14 distal portion 28 carrying slider 56. Aperturing 15 extends rearwardly from the spring portion 26 into the metal layer proximal portion 24 into adjacency with the mount plate 46 carried on actuator arm 52 via boss 40 in opening 50. Thus, with reference now to these Figs. particularly, the invention low stiffness, high torsion disk drive suspension comprises a laminate 12 of a metal layer 14 and a subassembly 16 comprising a plastic film layer 18 and a plurality of conductors 22. Laminate 12 has a base portion 24 and a spring portion 26 attached to metal layer distal portion 28. Laminate metal layer 14 has aperturing 15 to be locally discontinuous in the spring portion 26, thus to permit the subassembly 16 to pass through the spring portion upon bending of the spring portion and enable the subassembly 16 to not undergo the arc of the spring portion 26 when the suspension 1014 is bent. None, or less, stretching in the plastic film layer 18 eliminates or decreases changes in the intended gram load resultant from distortion of the plastic film layer.

To provide the passageway for the suspension subassembly 16 to pass through the reversely bent and arcuate spring portion 26, a hole 34 is provided at aperturing 15 in the spring portion and a continuation hole 1435 of that hole in the metal layer 14 proximal portion 24 and a continuation hole 1439 in the mount plate 46. Thus, holes 34 and 1435 are formed by having the metal layer 14 apertured to be locally discontinuous at 38 in the spring portion 1426, at 1435 in the layer 14 proximal portion 24, and at 1439 in the mount plate 46. Holes 34, 1435 and 1439 are contiguous and each a continuation of the other. In general, a typical hole 34, 1435, 1439 will be about 1.5 to 4 times as long as wide, and preferably about twice as long as wide, as noted below.

In the following Table, the results of modeling and actual measurements on a suspension according to the invention are shown. The suspension had the construction noted above (cf. FIGS. 1–4 embodiment), and had a centered hole 34 measuring 0.026 inch wide in both the Prior Art and Invention cases, and 0.025 inch long in the Prior Art case and 0.048 long in the Invention case. Metal layer width was constant; subassembly 16 width was constant.

TABLE

|  | Case 1 | | Case 2 | | Case 3 | |
| --- | --- | --- | --- | --- | --- | --- |
|  | Modeled | measured | Modeled | measured | Modeled | measured |
| First Torsion, Hz | 6590 | 7067 | 6480 |  | 6467 | 6736 |
| Normalized | 1.000 | 1.000 | 0.983 |  | 0.981 | 0.953 |
| Vertical stiffness, N/m | 13.10 | 15.38 | 11.47 |  | 10.78 | 9.33 |
| Normalized | 1.000 | 1.000 | 0.875 |  | 0.822 | 0.607 |
| Sway mode, Hz |  | 9676 |  |  |  | 10057 |
| Normalized |  | 1.000 |  |  |  | 1.039 |
| Backbend @ 1 mm, gmf |  | 0.14 |  |  |  | 0.08 |
| Normalized |  | 1.000 |  |  |  | 0.571 |
| Backbend @ 2 mm, gmf |  | 0.31 |  |  |  | 0.18 |
| Normalized |  | 1.000 |  |  |  | 0.581 |

The modeled and measured data differ slightly, with the measured data showing an increased advantage for the invention, Case 3. Specifically, there is a 39.3% improvement (decrease) in vertical stiffness vs. only a 4.7% degradation (decrease) in torsion. This result is accompanied by a 3.9% improvement in sway resonant frequency and an improvement in gram load change as well. As previously noted, the effect of backbending is how much of the preset (intended) gram load force is lost by lifting the suspension away from the disk by some distance such as 1 or 2 mm. At the lower 1 mm. backbend, the invention has a 62.9% improvement over the no hole case, Case 1, (decrease in gram load change), and at 2 mm. backbend a 42.9% improvement over the no hole case, Case 1. The invention thus provides a suspension design in which the ratio of sought-after vertical stiffness reduction to unwanted torsion reduction is about 8 to 1 or better depending on the amount of backbend.

In its method aspects, and with reference to FIGS. 1–4 as typical, the invention provides a method of limiting gram load changes in disk drive suspension 10 including in a suspension laminate 12 of a metal layer 14 and a subassembly 16 of a plastic film 18 and a plurality of conductors 22 that has a base portion 24, a spring portion 26 and a distal portion 28 defining a discontinuity 38 in the metal layer of the spring portion sized to pass the subassembly in the bent condition of the metal layer through the plane of the metal layer, and passing the subassembly through the discontinuity chordally to the arc of the bent metal layer against stretching the plastic film along the arc and thereby changing the gram load of the suspension.

The method further includes defining discontinuity a 42 in the in the metal layer 14 of the distal portion 28 or in other embodiments in the base 24 or mount plate 46, that will be contiguous with the spring portion discontinuity 38, and passing the subassembly through the spring portion and the distal (and proximal) portion discontinuities chordally to the arc of the bent metal against stretching the plastic film along the arc and thereby changing the gram load of the suspension, and maintaining attached to the distal portion a stiffener 32, and stiffening the distal portion with the stiffener.

The invention thus provides, more generally, a suspension that eliminates or greatly reduces the amount of lost torsion for each increment in stiffness reduction and in which the change in intended gram load is minimized through the utilization of the same suspension structure that provides the better ratio of torsion loss/stiffness decrease. The invention provides a suspension in which there is a hole or discontinuity in the spring portion carrying on to the distal portion of the suspension that enables decrease in suspension stiffness at little or no loss in torsion. The discontinuity further acts to allow the plastic film part of the suspension laminate to avoid stretching with the metal layer part of the laminate during backbending of the suspension by passing through the discontinuity instead of bending arcuately with the metal layer. The problem of the stretched plastic film changing the suspension intended gram load is thus avoided.

The foregoing objects are thus met.

I claim:

1. Low stiffness, high torsion disk drive suspension for applying an intended gram load, said suspension comprising a laminate of a metal layer and a subassembly comprising a plastic film layer and a plurality of conductors, a base portion, a distal portion, and a spring portion traversed by said subassembly, said spring portion and neither, either or both of said base portion and said distal portion being discontinuous for passing of said subassembly through the respective planes of said portions upon bending of said spring portion, whereby stretching of said plastic film layer and resultant change in said intended gram load is limited.

2. Low stiffness, high torsion disk drive suspension according to claim 1, in which said spring portion comprises a separately formed element attached to said base portion and said distal portion in connecting relation.

3. Low stiffness, high torsion disk drive suspension according to claim 2, in which said suspension distal portion is discontinuous opposite said subassembly in subassembly passing relation upon spring portion bending.

4. Low stiffness, high torsion disk drive suspension according to claim 3, in which said suspension base portion is discontinuous opposite said subassembly in subassembly passing relation upon spring portion bending.

5. Low stiffness, high torsion disk drive suspension according to claim 2, in which said suspension base portion is discontinuous opposite said subassembly in subassembly passing relation upon spring portion bending.

6. Low stiffness, high torsion disk drive suspension according to claim 1, in which said spring portion is formed from said laminate metal layer.

7. Low stiffness, high torsion disk drive suspension according to claim 1, in which said spring portion is discontinuous opposite said subassembly and over the adjacent edge margin of said distal portion in subassembly passing relation.

8. Low stiffness, high torsion disk drive suspension according to claim 1, in which said suspension base portion is discontinuous opposite said subassembly in subassembly passing relation upon spring portion bending.

9. Low stiffness, high torsion disk drive suspension according to claim 1, in which said suspension distal portion is discontinuous opposite said subassembly in subassembly passing relation upon spring portion bending.

10. Low stiffness, high torsion disk drive suspension according to claim 1, in which neither said base portion nor said distal portion is discontinuous opposite said subassembly.

11. Low stiffness, high torsion disk drive suspension according to claim 1, in which both said base portion and said distal portion are discontinuous opposite said subassembly.

12. Low stiffness, high torsion disk drive suspension for applying an intended gram load and comprising a laminate of a metal layer and a subassembly comprising a plastic film layer and a plurality of conductors, a base portion, a distal portion, and a separately formed spring portion connecting said base portion to said distal portion, said spring portion being traversed by said subassembly, said spring portion being discontinuous to pass said subassembly through the plane of said spring portion upon bending of said spring portion toward said laminate, whereby stretching of said plastic film and resultant change in intended gram load are reduced from that occurring when said subassembly is bent with said spring portion and its film layer stretched.

13. The low stiffness, high torsion disk drive suspension according to claim 12, in which said laminate metal layer comprises stainless steel.

14. The low stiffness, high torsion disk drive suspension according to claim 12, in which said plastic film comprises a polyimide film.

15. The low stiffness, high torsion disk drive suspension according to claim 12, in which said distal portion comprises a stiffener of greater stiffness than said laminate metal layer for supporting said laminate.

16. Low stiffness, high torsion disk drive suspension according to claim 12, in which said separately formed spring portion is fixed to said base and distal portions.

17. Low stiffness, high torsion disk drive suspension according to claim 12, in which said spring portion is discontinuous opposite said subassembly and over the adjacent edge margin of said distal portion in subassembly passing relation.

18. Low stiffness, high torsion disk drive suspension according to claim 12, in which said spring portion is formed from said laminate metal layer.

19. Low stiffness, high torsion disk drive suspension according to claim 12, in which said suspension base portion is discontinuous opposite said subassembly in subassembly passing relation upon spring portion bending.

20. Low stiffness, high torsion disk drive suspension according to claim 12, in which said suspension distal portion is discontinuous in subassembly passing relation upon spring portion bending.

21. Low stiffness, high torsion disk drive suspension according to claim 12, in which both said base portion and said distal portion are discontinuous opposite said subassembly.

22. Low stiffness, high torsion disk drive suspension according to claim 1, in which neither said base portion nor said distal portion is discontinuous opposite said subassembly.

23. Low stiffness, high torsion disk drive suspension for applying an intended gram load, said suspension comprising a laminate of a metal layer and a subassembly comprising a plastic film layer and a plurality of conductors, a base portion, a distal portion, and a spring portion traversed by said laminate, said spring portion and one or both of said base portion and said distal portion being discontinuous for passing of said subassembly through the respective planes of said portions upon bending of said spring portion, whereby stretching of said plastic film layer and resultant change in said intended gram load is limited.

24. Low stiffness, high torsion disk drive suspension according to claim 23, in which said spring portion is separately formed from said base and distal portions and fixed thereto.

25. Low stiffness, high torsion disk drive suspension according to claim 22, in which said spring portion is discontinuous opposite said subassembly and over the adjacent edge margin of said distal portion in subassembly passing relation.

26. Low stiffness, high torsion disk drive suspension having an intended gram load, said suspension comprising for mounting by a mounting plate having a distal edge, a laminate of a metal layer and a subassembly of a plastic film layer and a plurality of conductors separated from said metal layer by said plastic film layer, said laminate having a proximate base portion substantially free of said conductors and adapted to be mounted to an actuator with said mounting plate, a distal portion adapted to mount a slider electrically connected to said conductors, a spring portion separately formed from and connecting said proximate and distal portions, and a stiffener fixed to said distal portion distally of said spring portion, said stiffener having a proximate edge; a suspension first region between said proximate edge and said distal edge and extending in a plane generally parallel with said spring portion plane and having substantially the length and width of said spring portion, said first region defining a first discontinuity; a suspension second region contiguous with and distal to said first region and including said proximate edge, said second region defining a second discontinuity that is a continuation of said first region discontinuity; and a suspension third region contiguous with and proximate of said first region and including said distal edge, said third region defining a third discontinuity including said distal edge, whereby said subassembly moves in response to backbending of said spring portion in an arc through said first, second and third discontinuities rather than stretching fully over the arc of said spring portion to lessen any change in said intended gram load resultant from stretching of said plastic film layer in said subassembly.

27. A method of limiting gram load changes in a disk drive suspension comprising a laminate of a metal layer and a subassembly of a plastic film and a plurality of conductors and a base portion, a spring portion and a distal portion, including defining a discontinuity in the spring portion and in adjacent portions of one or both of said base and distal portions that passes said subassembly in the bent condition of said spring portion through said discontinuity chordally to the arc of said bent spring portion against stretching of said plastic film along said arc and thereby changing the gram load of said suspension.

\* \* \* \* \*